United States Patent [19]
Miyamoto et al.

[11] Patent Number: 6,104,972
[45] Date of Patent: Aug. 15, 2000

[54] PASSENGER SENSING SYSTEM

[75] Inventors: Keiji Miyamoto; Masahiko Sano; Naoki Oda, all of Tokyo; Junshiro Motoyama, Osaka, all of Japan

[73] Assignee: NEC Corporation, Tokyo, Japan

[21] Appl. No.: 09/176,770

[22] Filed: Oct. 22, 1998

[30] Foreign Application Priority Data

Oct. 22, 1997 [JP] Japan .................................... 9-290066

[51] Int. Cl.⁷ .................................................. B60R 21/32
[52] U.S. Cl. ................................ 701/45; 701/46; 701/36; 280/737; 280/735
[58] Field of Search .................................. 701/45, 46, 36; 280/734; 340/436, 665, 667; 180/271

[56] References Cited

U.S. PATENT DOCUMENTS 5,987,370  11/1999  Murphy et al. .......................... 701/45

Primary Examiner—Tan Nguyen
Assistant Examiner—Arthur D Donnelly
Attorney, Agent, or Firm—Sughrue, Mion, Zinn, Macpeak & Seas, PLLC

[57] ABSTRACT

A background heat source unit 4 having a plurality of heat sources, which are arranged substantially at a fixed interval and set to a temperature different from the body temperature of passenger and also from the ambient temperature, and an infrared sensor 7, are disposed such that they face each other via a passenger. Whether a passenger is present is checked according to the result of a check, made by comparing a detected temperature pattern of the background heat source unit 4, detected by the infrared sensor 7, and a reference temperature pattern of the background heat source unit 4, preliminarily stored in a control circuit 17, as to whether a non-identical area is present in the compared temperature patterns.

18 Claims, 14 Drawing Sheets

(a)

(b)

(a)

(b) REFERENCE TEMPERATURE PATTERN

6b1 6b2 6b3 6b4 6b5 6b6

(c) SOLID LINE POSITION PATTERN

6b1 6b2 6b3 6b4 6b5 6b6

(d) BROKEN LINE POSITION PATTERN

6b1 6b2 6b3 6b4 6b5 6b6

(a)

(b)

PASSENGER SENSING SYSTEM

BACKGROUND OF THE INVENTION

This invention relates to passenger sensing system and method and, more particularly, to improvements in passenger sensing system and method, in which the air bag of an air bag unit installed in a car can be set to an expansible or non-expansible state according to the seated state of a passenger on an assistant's seat of the car.

The air bag unit is usually provided in the car in order to alleviate a shock exerted to a passenger in the event of collision of the car. The air bag unit is inevitable for the car safety, and it is recently installed not only in the driver's seat but also in the assistant's seat.

In FIG. 15 showing an air bag unit, the illustrated air bag comprises a squeave circuit on the driver's seat side, which is a series circuit of a safing sensor SS1, a squeave SQ1 and a semiconductor switching element SW1 such as an FET field-effect transistor, a squeave circuit on the assistant's seat, which is a series circuit of a safing sensor SS2, a squeave SQ2 and a semiconductor switching element SW2 such as an FET, an electronic acceleration sensor or shock sensor) GS, and a control circuit CC which has a function for supplying a signal to the gates of the semiconductor switching elements SW1 and SW2 by making a check, according to the output signal of the electronic acceleration sensor GS, as to whether collision has taken place.

With this air bag unit, in the event of collision of the car due to some cause, the switch contacts of the safing sensors SS1 and SS2 are closed in response to a relatively low acceleration. As a result, the squeave circuits on the driver s seat and the assistant's seat are made ready to be operated. When the control circuit CC determines according to the signal from the electronic acceleration sensor GS that collision of the car has taken place, it supplies a signal to the gates of the semiconductor switching elements SW1 and SW2 to turn on these elements. Consequently, a current is caused to pass through the squeave circuits, thus causing heat generation from the squeaves SQ1 and SQ2 and expansion of the air bags on the driver's and assistant's seats. In this way, the passengers are protected from the shock due to the collision.

According to this air bag unit, the above effect of the passenger protection in the event of the collision can be expected in the case when an adult P is seated in a seat 1, as shown in FIG. 16(a). However, in the case when a child SP is seated in a rearward-facing child seat (hereinafter referred to as RFCS) 1A which is secured to the top of an assistant's seat 1 as shown in FIG. 16(b), adverse effects of the expansion of the air bag on the child SP is anticipated. In this case, therefore, it is desirable that the air bag remains without being expanded even in the event of a collision. In another case when a child SP is seated in a forward-facing child seat (hereinafter referred to as FFCS) 1A secured to the top of an assistant's seat 1 as shown in FIG. 16(c), it is anticipated that the face of the child SP would be covered by the expanded air bag. In this case, like the case of the RFCS, it is again desirable that the air bag remains without being expanded even in the event of a collision.

To cope with the above problem, an air bag unit as shown in FIG. 17 has been proposed. This air bag unit has a sensor SD for checking whether or not a passenger is seated in the assistant's seat. In this unit, the control circuit CC checks the seated status of a passenger on the assistant's seat and, as a result of the check, sets the air bag to be in a state able or unable to be expanded. As the sensor SD has been proposed one which uses a weight sensor comprising a piezoelectric sensor for measuring the weight, and one in which a photograph of a passenger seated in a seat, taken with a camera, is processed for making a check as to whether the passenger is an adult P or a child SP, or in the case of a child SP, whether the child SP is on the FFCS or RFIS.

The former sensor permits a rough check as to whether a passenger is an adult P or a child SP and, as a result of the check, setting the air bag to the state able or unable to be expanded for evading an accident in the event of a collision. However, the person's weight varies with individuals, and a child may be heavier than an adult. Therefore, the sensor lacks accuracy. In addition, the sensor cannot check whether a child is on the RFCS OR FFCS.

The latter sensor can relatively accurately check the state of a passenger, whether the passenger is an adult P or a child SP and whether a child on the child seat is in the state of the RFCS or FFCS. However, it is necessary to photograph the passenger with a camera, process the photograph data and compare the processed data with various patterns. Therefore, a problem is posed that a complicated and expansive processor is necessary.

To cope with this problem, a passenger sensing system using an infrared sensor or an ultrasonic sensor has been proposed in, for instance, U.S. Pat. No. 5,482,314. In this passenger sensing system, an infrared sensor comprising a plurality of elements and an ultrasonic sensor are disposed above a front seat, and the seated status of a passenger on a seat is checked by checking whether the data from these sensors have a temperature pattern and an ultrasonic pattern corresponding to the seated status of a passenger on a seat (such as a seated adult, a child on the RFIS or vacant seat).

This proposed system can make a check with considerable accuracy under particular conditions as to whether a passenger is present owing to combined effects of the infrared and ultrasonic sensors. However, the system has a problem that the accuracy of detection is adversely affected by ambient conditions and unstable. Specifically, when the car room is cooled so that cool air is in contact with the passenger s face and the like, the passenger's surface temperature is reduced so that the result of detection of the infrared sensor does not always correspond to the body temperature. In addition, when the ambient temperature is close to the body temperature, the ambient temperature and the body temperature can not be discriminated from each other from the result of detection of the infrared sensor. Under such a condition, proper judgment can not be obtained by comparing the detection data from the infrared sensor and a reference temperature pattern data corresponding to various seated states of passengers or the like. With such adverse effects of the ambient conditions, accurate and stable passenger detection cannot be expected, and the air bag cannot be properly controlled.

SUMMARY OF THE INVENTION

An object of the present invention, therefore, is to provide a passenger sensing system and a passenger sensing method, which can accurately detect the seated state of a passenger on a seat without being substantially adversely affected by ambient conditions, and control the aptness of operation of an air bag unit or the like according to the result of the detection.

According to the present invention, there is provided a passenger sensing system comprising a background heat source unit including a plurality of heat sources arranged substantially at a fixed interval, the background heat source unit being set to a temperature different from the body temperature of a passenger and also from the ambient temperature, an infrared sensor facing the background heat source unit, for detecting the temperature of the heat sources, and a control circuit for checking whether a passenger is present according to the result of a check, made by comparing a detected temperature pattern of the background heat source unit, detected by the infrared sensor, and a preliminarily stored reference temperature pattern of the background heat source unit, also whether a non-identical area is present in the compared temperature patterns.

In the passenger sensing system, the control circuit checks, by comparing the detected temperature pattern of the background heat source unit, detected by the infrared sensor, and the reference temperature pattern of the background heat source unit, preliminarily stored in it, whether a non-identical area is present in the compared temperature patterns and, when a non-identical area is present, computes the position thereof relative to the reference temperature pattern.

According to another aspect of the present invention, there is provided a passenger sensing system comprising a background heat source unit including a plurality of heat sources arranged substantially at a fixed interval, the background heat source unit being set to a temperature different from the body temperature of a passenger and also from the ambient temperature, an infrared sensor facing the background heat source unit, for detecting the temperature of each of the heat sources, a body temperature detecting circuit for extracting a body temperature pattern of a passenger from the detected temperature pattern from the infrared sensor, and control circuit for checking whether a passenger is present according to the output signals from the infrared sensor and the body temperature detecting circuit, wherein the control circuit checks whether a passenger is present according to the result of a check, made by comparing a detected temperature pattern of the background heat source unit, detected by the infrared sensor, and a reference temperature pattern of the background heat source unit, preliminarily stored in it, as to whether a non-identical area is present in the compared temperature patterns and, when a non-identical area is present, checks whether a passenger is present by checking, according to output signal from the body temperature detecting circuit, whether a body temperature area is present in the non-identical area.

In the above passenger sensing system, the control circuit compares a detected temperature pattern of the background heat source unit, detected by the infrared sensor, and a reference temperature pattern of the background heat source unit, preliminarily stored in it, when a non-identical area is present in the compared temperature patterns, checks, according to output signal from the body temperature detecting circuit, whether a body temperature area is present and, when a body temperature area is present, computes the position of the non-identical area relative to the reference temperature pattern.

According to other aspect of the present invention, there is provided a passenger sensing system comprising a background heat source unit including a plurality of heat sources arranged substantially at a fixed interval, the background heat source unit being set to a temperature different from the body temperature of a passenger and also from the ambient temperature, an infrared sensor facing the background heat source unit, for detecting the temperature of each of the heat sources, a control circuit for checking whether a passenger is present according to the result of a check, made by comparing a detected temperature pattern of the background heat source unit, detected by the infrared sensor, and a preliminarily stored reference temperature pattern of the background heat source unit, as to whether a non-identical area is present in the compared temperature patterns, and an air bag unit having a function of expanding an air bag in response to a collision of the car, wherein the air bag of the air bag unit is set, according to check result data transmitted from the control circuit to the air bag unit, such that it is ready to be expanded or that its expansion is prohibited.

According to further other aspect of the present invention, there is provided a passenger sensing system comprising a background heat source unit including a plurality of heat sources arranged substantially at a fixed interval, the background heat source unit being set to a temperature different from the body temperature of a passenger and also from the ambient temperature, an infrared sensor facing the background heat source unit, for detecting the temperature of each of the heat sources, a control circuit for comparing a detected temperature pattern of the background heat source unit, detected by the infrared sensor, and a preliminarily stored reference temperature pattern of the background heat source unit, and checking, when a non-identical area is present in the compared temperature patterns, whether a passenger is present by checking, according to output signal from the body temperature detecting circuit, whether a body temperature area is present in the non-identical area, and an air bag unit having a function of expanding air bag in response a collision of the car, wherein the air bag in the air bag unit is set, according to check result data transmitted from the control circuit to the air bag unit, such that it is ready for expansion or that its expansion is prohibited.

In the above passenger sensing system, the control circuit checks, by comparing the detected temperature pattern of the background heat source unit, detected by the infrared sensor, and the reference temperature pattern of the background heat source unit, preliminarily stored in it, whether a non-identical area is present in the compared temperature patterns, when a non-identical area is present, computes the position thereof relative to the reference temperature pattern, and checks whether the passenger is seated in the seat at a position thereof within permissible range, and the air bag unit sets, according to the check result, the air bag such that the air bag is ready for expansion or that expansion of the air bag is prohibited.

In the passenger sensing system, the heat sources in the background heat source unit are controlled, according to output signal from a temperature sensor for detecting the ambient temperature, to a temperature from the body temperature of passenger and also from the ambient temperature, the background heat source unit is disposed on a ceiling part of the car or on a door side part of a seat of the car, and the infrared sensor is disposed that an upper half of a passenger will be found between the infrared sensor and the background heat source unit, or the background heat source unit includes a plurality of heat sources arranged at a fixed interval and made integral with a sheet-like insulating member having low heat conductivity.

The heat sources of the background heat source unit are bar-like or dot-like in shape.

In the above passenger sensing system, the heat sources of the background heat source unit are constituted by substantially planer heaters and set to a temperature higher than the ambient temperature, or the heat source so the background heat source unit are constituted by a cooling assembly and set to a temperature lower than the ambient temperature.

According to further other aspect of the present invention, there is provided a passenger sensing method using a background heat source unit having a predetermined temperature pattern and an infrared sensor, the background heat source unit and the infrared sensor being disposed such that they face each other, the method comprising the steps of comparing a detected temperature pattern of the background heat source unit, detected by the infrared sensor, and a reference temperature pattern of the sole background heat source unit, and checking whether a passenger is present by checking whether as non-identical area is present in the compared temperature patterns.

In the above passenger sensing method, when a non-identical area is present in the compared detected and reference temperature patterns, the check as to whether a passenger is present is made by checking whether a passenger's body temperature area is present in the non-identical area, when a non-identical area is present in the compared detected and reference temperature patterns, the position at which the passenger is seated in the seat is detected by computing the position of the non-identical area relative to the reference temperature pattern, or when a non-identical area is present in the compared detected and reference temperature patterns, whether a passenger's body temperature area is present in the non-identical area is checked and, when a body temperature area is present, the position of the non-identical area relative to the reference temperature pattern is checked.

According to still further aspect of the present invention, there is provided a passenger sensing method using a background heat source unit having a predetermined temperature pattern and an infrared sensor, the background heat source unit and the infrared sensor being disposed such that they face each other, and comprising the steps of comparing a detected temperature pattern of the background heat source unit, detected by the infrared sensor, and a reference temperature pattern of the sole background heat source unit, checking whether a passenger is present by checking whether a temperature pattern is present in the non-identical area, and transmitting check result signal to an air bag unit to set an air bag in the air bag unit such that the air bag is ready for expansion or that expansion of the air bag is prohibited.

Other objects and features will be clarified from the following description with reference to attached drawings.

PREFERRED EMBODIMENTS OF THE INVENTION

Preferred embodiments of the present invention will now be described with reference to the drawings.

Figure 1:
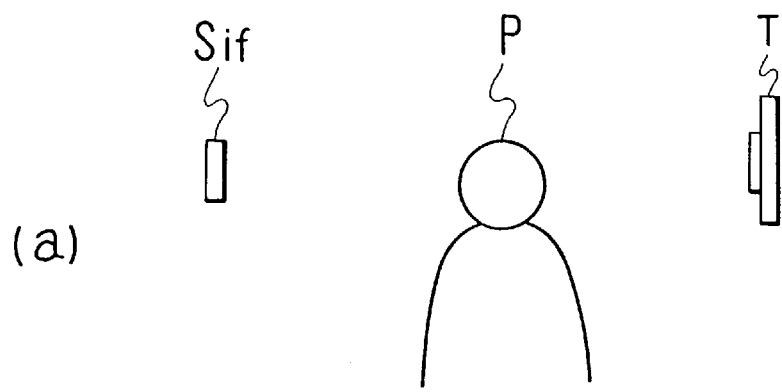
FIGS. 1(a) and 1(b) are views for describing the basic principles of a passenger sensing system according to the present invention, FIG. 1(a) being a side view, FIG. 1(b) being a front view.
Figure 1:
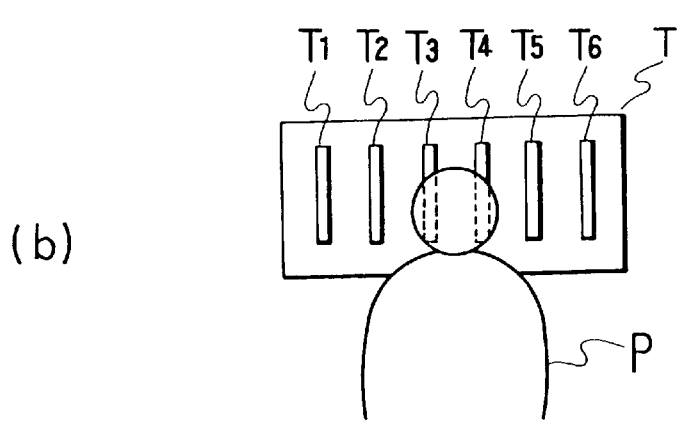
Figure 2:
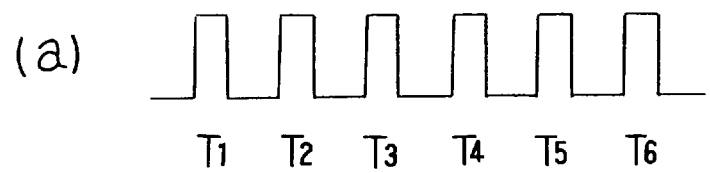
FIGS. 2(a) and 2(b) are views for describing temperature patterns obtained with the passenger sensing system shown in FIGS. 1(a) and 1(b), FIG. 2(a) being a view showing a reference temperature pattern of a background heat source unit, FIG. 2(b) being a view showing a detected temperature pattern of the background heat source unit, detected by an infrared sensor.
Figure 2:
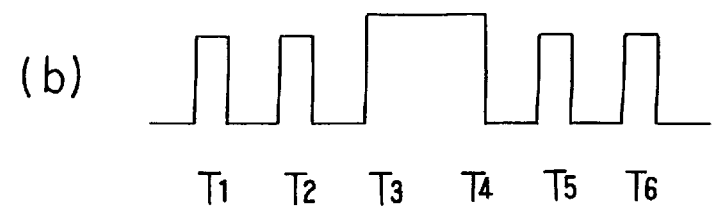

The basic principles underlying the present invention will now be described with reference to FIGS. 1 and 2. In the passenger sensing system and method according to the present invention, basically an infrared sensor Sif and a background heat source T are disposed on opposite sides of a passenger P, and a check as to whether a passenger is present is made by comparing a detected temperature pattern of the background heat source T, detected by the infrared sensor SiF, and a predetermined reference temperature pattern of the background heat source T and checking whether a passenger is present. Specifically, as shown in FIG. 1, the infrared sensor SiF is disposed on one side of the passenger P, and the background heat source T, which has a plurality of heat sources T1 to T6 set to a temperature different from the temperature of the passenger P and the ambient temperature, is disposed on the other side of the passenger P. In this state, the temperature pattern of the background heat source T in the absence of passenger P (hereinafter referred to as reference temperature pattern) is set as shown in FIG. 2. When the passenger P is present as shown FIG. 1, the infrared temperature sensor Sif detects the temperature pattern of the background heat source T (hereinafter referred to as detected temperature pattern) as shown in FIG. 2(b).

In the instant case, because of the presence of the person's body (i.e., passenger P) such as to block the front of the heat sources T3 and T4, the corresponding part of the temperature pattern is different from the other part thereof. More specifically, in the condition as shown in FIG. 1(b), with the heat sources T3 and T4 of the background heat source T blocked by the head of the passenger P, the infrared rays from the heat sources T3 and T4 are mostly blocked by the passenger P although the infrared rays from the heat sources T1 to T6 are directly detected by the infrared sensor Sif. Thus, the infrared rays from the face of the passenger P are detected. Thus, by comparing the detected and reference temperature patterns, it is seen that they are different in the part corresponding to the heat sources T3 and T4. Thus, it is clearly confirmed that a non-identical area is present between the two temperature patterns. When the two temperature patterns are identical, it is determined that no passenger is present, who disturbs the temperature pattern of the background heat source T.

Figure 3:
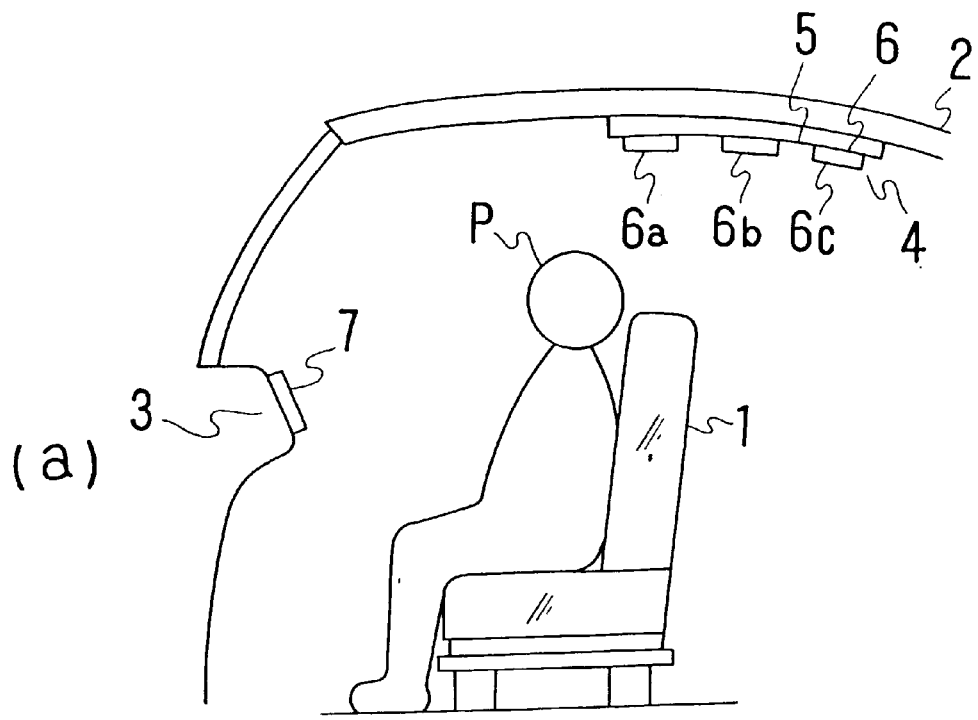
FIGS. 3(a) and 3(b) are views showing a specific example of the passenger sensing system according to the present invention, FIG. 3(a) being a schematic side view showing the manner of disposing the background heat source unit and the infrared sensor in a car room, FIG. 3(b) being a front view showing the background heat source unit.
Figure 3:
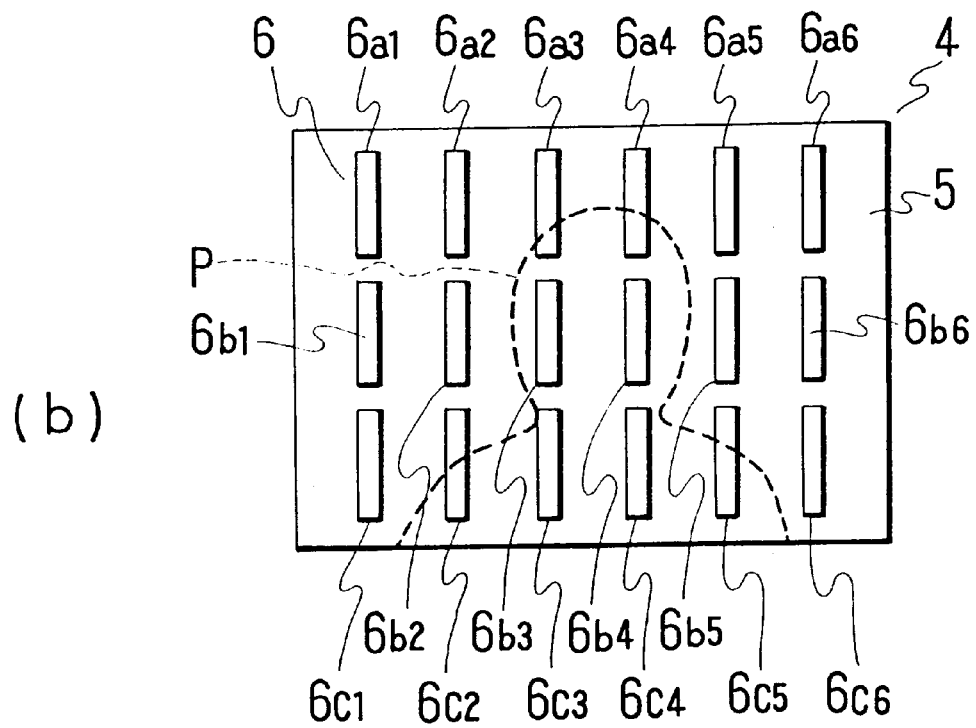
Figure 15:
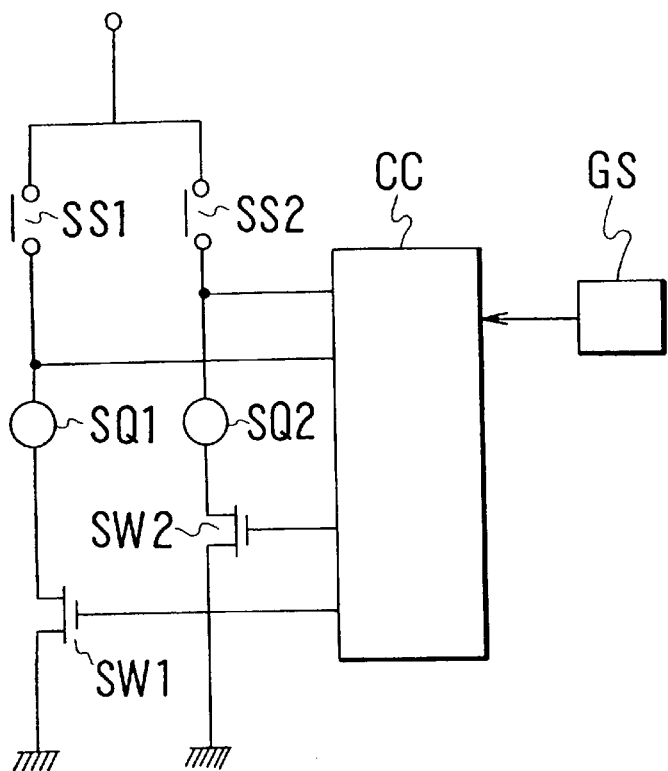
FIG. 15 is a block diagram showing a prior art air bag unit.
Figure 16:
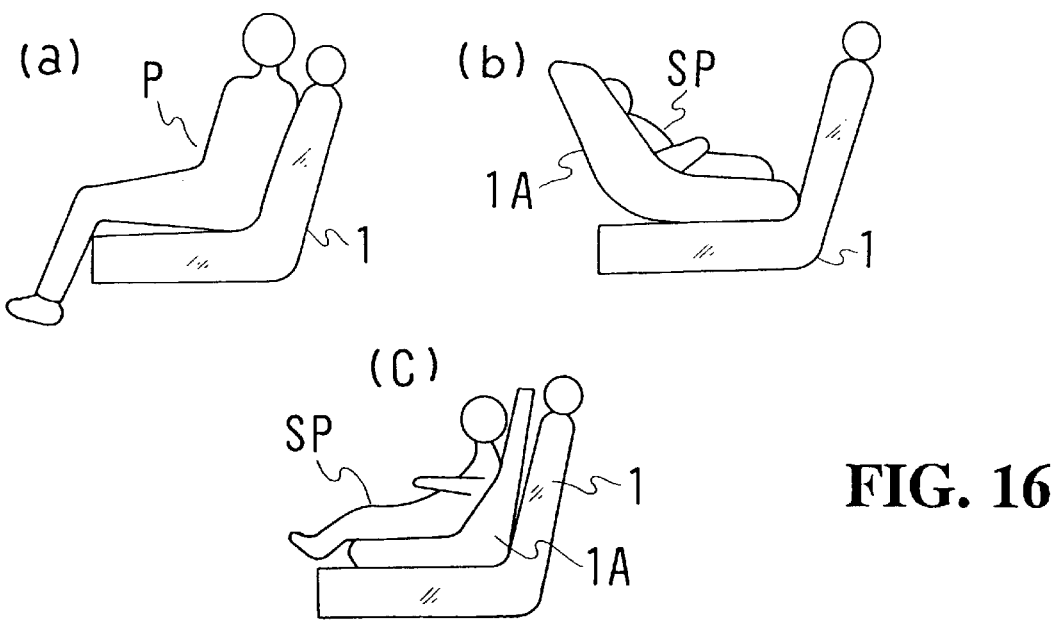
FIGS. 16(a) to 16(c) are views showing various seated states, FIG. 16(a) showing an adult passenger seated in a seat, FIG. 16(b) showing a child seated in an RFCS, FIG. 16(c) showing a child seated in an FFCS.
Figure 17:
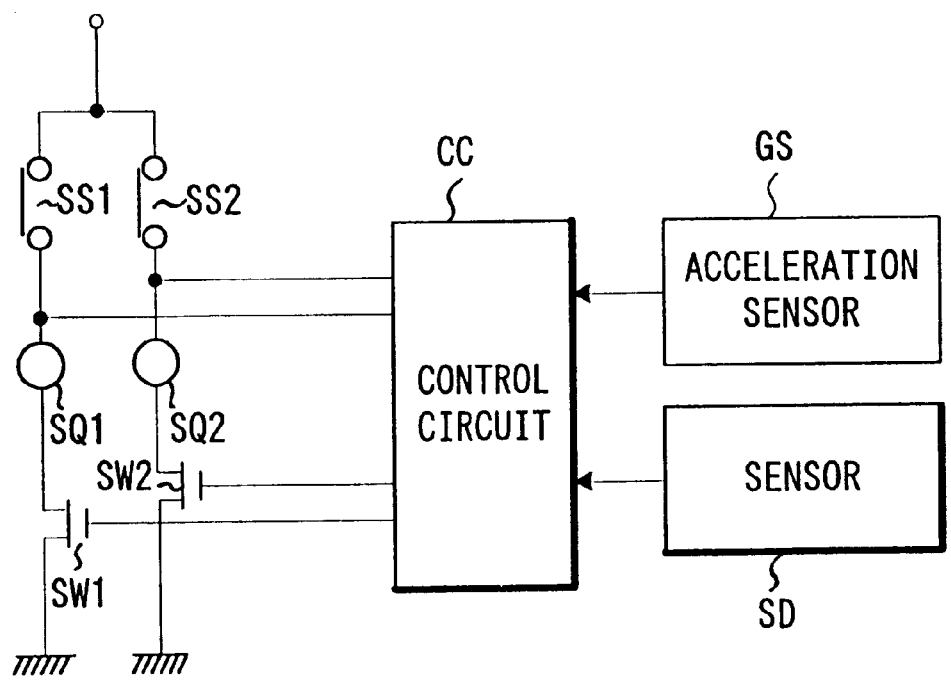
FIG. 17 is a block diagram showing an improved air bag unit in the prior art.

Now, as first embodiment of the passenger sensing system according to the present invention utilizing the above principles, will be described with reference to FIGS. 3 to 5. In these Figures, parts like those in the prior art system shown in FIGS. 15 to 17 are designated by like reference numerals, and are not described. Referring to the Figures, designated at 1 is a passenger's seat disposed in a car room and seated by a passenger P, at 2 a ceiling of the car, and at 3 a dashboard part disposed ahead of the seat 1. A background heat source unit 4 is disposed on a predetermined part of the ceiling 2. The background heat source includes a sheet-like insulating member 5, which has low heat conductivity and heat resistance and covered by a low heat conductivity interior material, and a plurality of heat sources 6 secured substantially at a constant interval to the insulating member 5. The individual heat sources 6 are substantially planar heaters having a bar-like shape of the same and provided as an array of three rows, of heat sources 6a1 to 6a6, 6b1 to 6b6 and 6c1 to 6c6, on the insulating member 6. An infrared sensor 7 is provided on the dashboard part 3 on the side of the passenger (particularly an exposed skin part thereof such as the face) opposite the background heat source unit 4. The infrared sensor 7 may be either cooled or non-cooled type but is suitably non-cooled borometer type utilizing changes in resistance with temperature, and has a temperature resolution of, for instance, about 0.1° C. The inferred sensor 7 has plurality of sensor elements corresponding to the heat sources 6a1 to 6a6, 6b1 to 6b6 and 6c1 to 6c6, and provide data representing the detected temperature of the corresponding heat sources 6. Alternatively, the infrared sensor 7 may be constituted by a single sensor element for detecting and providing data of the temperatures of the heat sources 6 successively.

Figure 4:
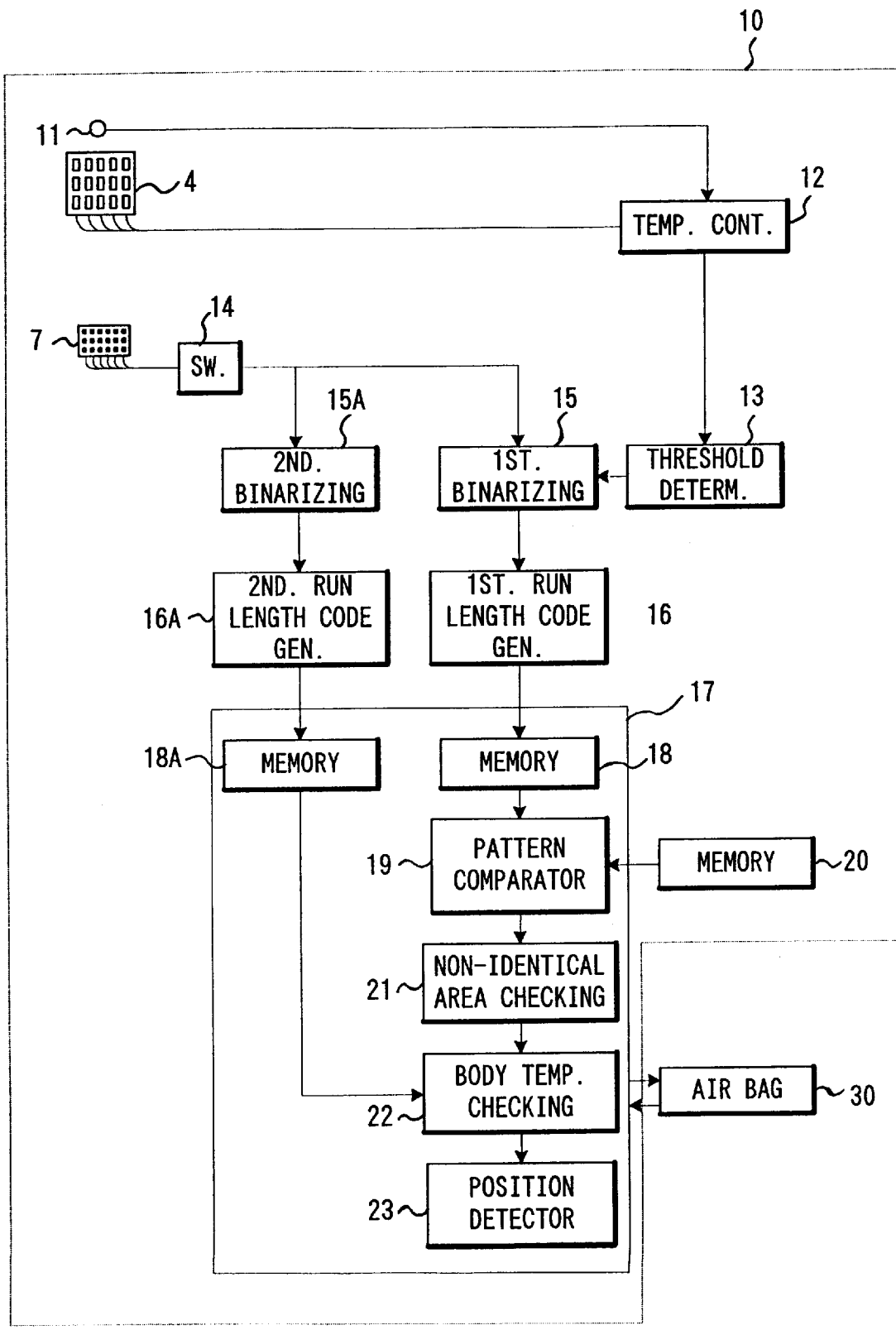
FIG. 4 is a block diagram showing a first embodiment of the passenger sensing system according to the present invention.
Figure 5:
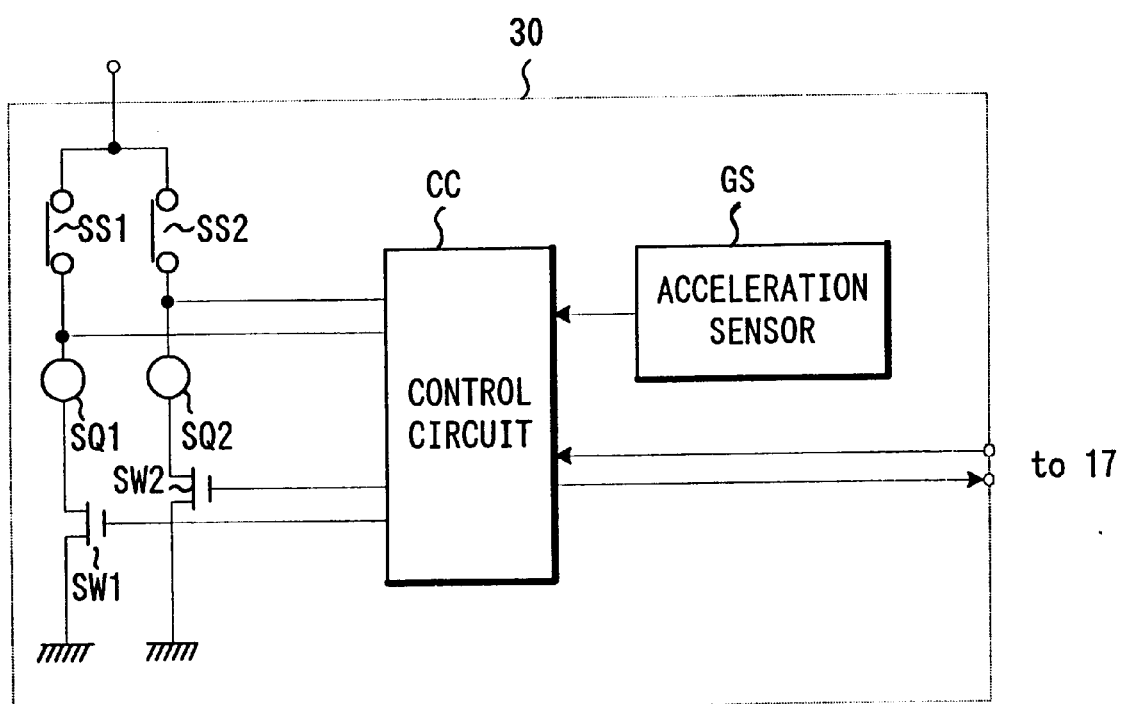
FIG. 5 is a block diagram showing an air bag unit in the passenger sensing system according to the present invention.

The background heat source unit 4 and the infrared sensor 7 constitute a sensor unit 10 as shown in FIG. 4. Specifically, the sensor unit 4 comprises the background heat source unit 4, an infrared sensor 7 facing the background heat source unit 4, a temperature sensor 11 for detecting the ambient temperature, a temperature control circuit 12 for controlling the temperature of the heat sources 6 in the heat source unit 6 to a temperature different from the ambient temperature, a threshold determining circuit 13 for determining a threshold in a process of binalizing the detected temperature data of the infrared sensor 7 according to the outputs of the temperature sensor 11 and temperature control circuit 12, a switching circuit 14 for switching the detected temperature signals of the sensor elements of the infrared sensor 7 (i.e., signals corresponding to the detected temperature pattern), a first binalizing circuit 15 for binalizing the output signal of the switching circuit 14 according to the threshold determined by the threshold determining circuit 13, a second binalizing circuit 15A for binalizing the output signal of the switching circuit 14 to provide "1" when the signal represents a temperature of 36 to 37° which is thought to be the body temperature and "0" otherwise, a first run length code generator 16 for generating a run length code concerning the output signal of the first binalizing circuit 16, a second run length code generator 16A for generating a run length code concerning the output signal of the second binalizing circuit 15A, and a control circuit 17 including a CPU or the like. The threshold is determined by using, for instance, a conversion table.

The control circuit 17 includes a first and a second run length code memory 18 and 18A for storing run length codes provided from the first and second run length code generators 16 and 16A, a pattern comparator 19 for comparing a first run length code corresponding to the detected temperature pattern read out from the first run length code memory 18 and a reference run length code corresponding to a reference temperature pattern to be described later, a memory 20 for storing the reference temperature pattern, which is obtained by binalizing the temperature pattern of the background heat source unit 4 in the absence of any passenger and run length coding the temperature pattern, a non-identical area checking unit 21 for checking whether a non-identical area is present between the first run length code (detected temperature pattern) and the reference run length code (reference temperature pattern) by comparing the two patterns, a body temperature checking unit 22 for checking for a non-identical area including a body temperature area which is read out from the second run length code memory 18A, and a position detector 23 for detecting the position of a body temperature area. An air bag unit 30 as shown in detail in FIG. 5 is connected to the control circuit 17 of the sensor unit 10. The air bag unit 30 is basically the same as the one shown in FIG. 15. The switching circuit 14 is switched at timings under control of a clock signal from the control circuit 17 or a clock generator not shown.

Figure 6:
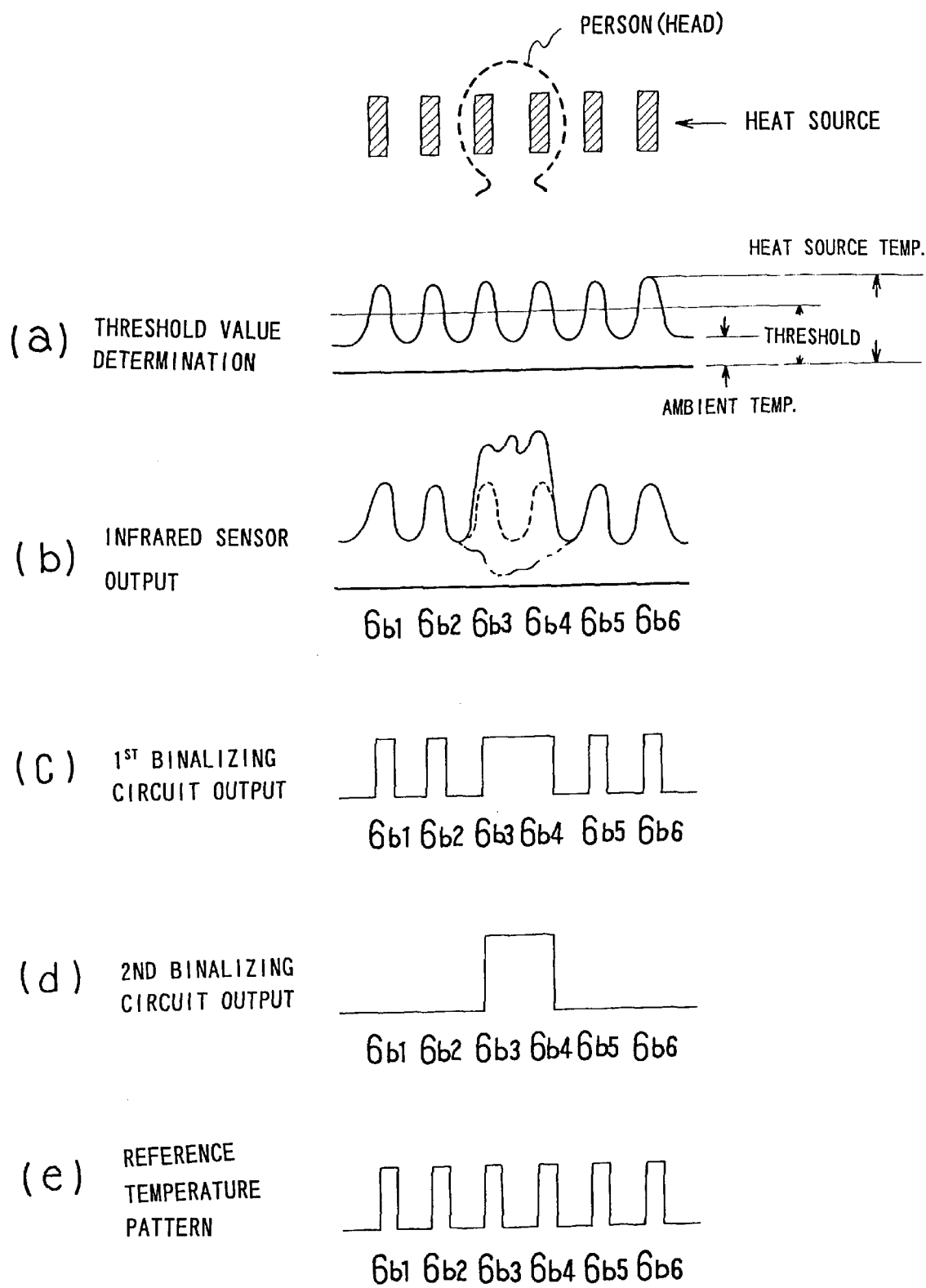
FIGS. 6(a) to 6(e) are waveform diagrams showing detection signals in various parts shown in FIG. 4, FIG. 6(a) showing a threshold level, FIG. 6(b) showing the detection output of the infrared sensor, FIG. 6(c) showing the output of a first binalizing circuit, FIG. 6(d) showing the output of a second binalizing circuit, FIG. 6(e) showing the reference temperature pattern of the background heat source unit.

The operation of the passenger sensing system having the above construction will now be described with reference to FIGS. 3 to 6. The background heat source unit 4 which is disposed as shown in FIG. 3 is temperature controlled by the temperature control circuit 12 according to the ambient temperature detected by the temperature sensor 11 to a temperature different from the ambient temperature, for instance a temperature higher than the ambient temperature by 2 to 3° C., preferably about 5° C. FIG. 6(a) shows the relation between the controlled temperature and the ambient temperature, which is obtained by utilizing the second row of heat sources 6b1 to 6b6 in the background heat source unit 4 as typical example. The threshold determining circuit 13 provides threshold data in the binalizing process to the first binalizing circuit 15 according to the outputs of the temperature sensor 11 and the temperature control circuit 12. The level of the threshold is set as shown in FIG. 6(a), for instance.

In the meantime, infrared rays (representing temperature) emitted from the background heat source unit 4 and the passenger P, are detected by a plurality of sensor elements of the infrared sensor 7, and the outputs thereof are provided sequentially to the first binalizing circuit 15 as the switching circuit 14 is switched under control of the clock signal from the control circuit 17. The output signal of the switching circuit 4 (i.e., the infrared sensor 15) is shown by solid curve in FIG. 6(b). The first binalizing circuit 15 binalizes its input according to the threshold level determined by the threshold determining circuit 13 as shown in FIG. 6(c). The first run length code generator 16 run length codes the binalized data output of the first binalizing circuit 15. The code data obtained from the first run length code generator 16 is stored in the first run length code memory 18. The output signal of the switching circuit 14 is also provided to the second binalizing circuit 15A. The second binalizing circuit 15A binalizes the input to obtain binalized data, which is "1" when the detected temperature is 36 to 37° which is thought to be the temperature of the person's body and "0" otherwise. The binalized data output is as shown in FIG. 6(d). The second run length code generator 16A run length codes the binalized data to generate code data, which is stored in the second run length code memory 18A in the control circuit 17.

The pattern comparator 19 checks whether a non-identical area is present between the first run length code data (detected temperature pattern) read out from the first run length code memory 18 and the reference run length code data read out from the memory 20, corresponding to the reference temperature pattern as shown in FIG. 6(c), by comparing the two patterns. The detected temperature pattern' shown in FIG. 6(c) and the reference temperature pattern shown in FIG. 6(e) are obviously different in their parts corresponding to the heat sources 6b3 and 6b4, and thus the non-identical area checking unit 21 determines that a non-identical area is present. It is thus confirmed that a passenger P is present between the infrared sensor 7 and the background heat source unit 4.

When the non-identical area checking unit 21 determines that a non-identical area is present, the body temperature checking unit 22 checks whether a body temperature area is present in the non-identical area. The body temperature area check is made according to the second run length code corresponding to the data shown in FIG. 6(c), read out from the second run length code memory 18A. The body temperature pattern shown in FIG. 6(d) is such that its portion corresponding to the heat sources 6b3 and 6b4 has a pattern showing the presence of a body temperature area. The body temperature area checking unit 22 thus determines that a body temperature area is present, that is, the presence of the passenger P is confirmed in this portion as well.

When the body temperature area checking unit 22 determines that the body temperature area is present, the position detector 23 detects the position, at which the passenger P is seated in the seat 1. In this instance, as shown in FIG. 3, the passenger P is seated with his or her head at the position corresponding to the heat sources 6b3 and 6b4. The position detector 23 thus computes position coordinates according to the body temperature pattern (i.e., second run length code) shown in FIG. 6(D), and determines that the passenger is seated at the normal position. The detection outputs of the infrared sensor 7 concerning the heat sources 6a1 to 6a6 and 6c1 to 6c6 in the background heat source unit 4, are processed in the same manner as those concerning the heat sources 6b1 to 6b6. That is, the head position can be reliably detected by the position detector 23 even when it is in the first or third row of heat sources as well.

The signal from the control circuit 17 is transmitted to the air bag unit 30. Easily the detection signal from the non-identical area checking unit 21, preferably the signal from the body temperature checking unit 22, more preferably the signal from the position detector 23, is transmitted to the air bag unit 30. Thus, when the signal from the control circuit 17 shows the presence of the passenger P, the air bag unit 30 as shown in FIG. 5 is set according to the signal from the control circuit 17 such that it is ready to be expanded. On the other hand, when the signal shows not shown the presence of any passenger, the air bag unit 30 is set according the signal from the control circuit 17 such that its expansion is prohibited. The signal from the control circuit 17 is provided to a control circuit CC in the air bag unit 30. In the latter case noted above, it is set such that no gate signal is provided to a semiconductor switching element SW2 on the side of the assistant's seat at the time of collision of the car. In this case, a gate signal is provided to a semiconductor switching element SW1 on the side of the driver's seat. In the former case noted above, it is set such that a gate signal is provided to both the semiconductor switching elements SW1 and SW1.

Figure 7:
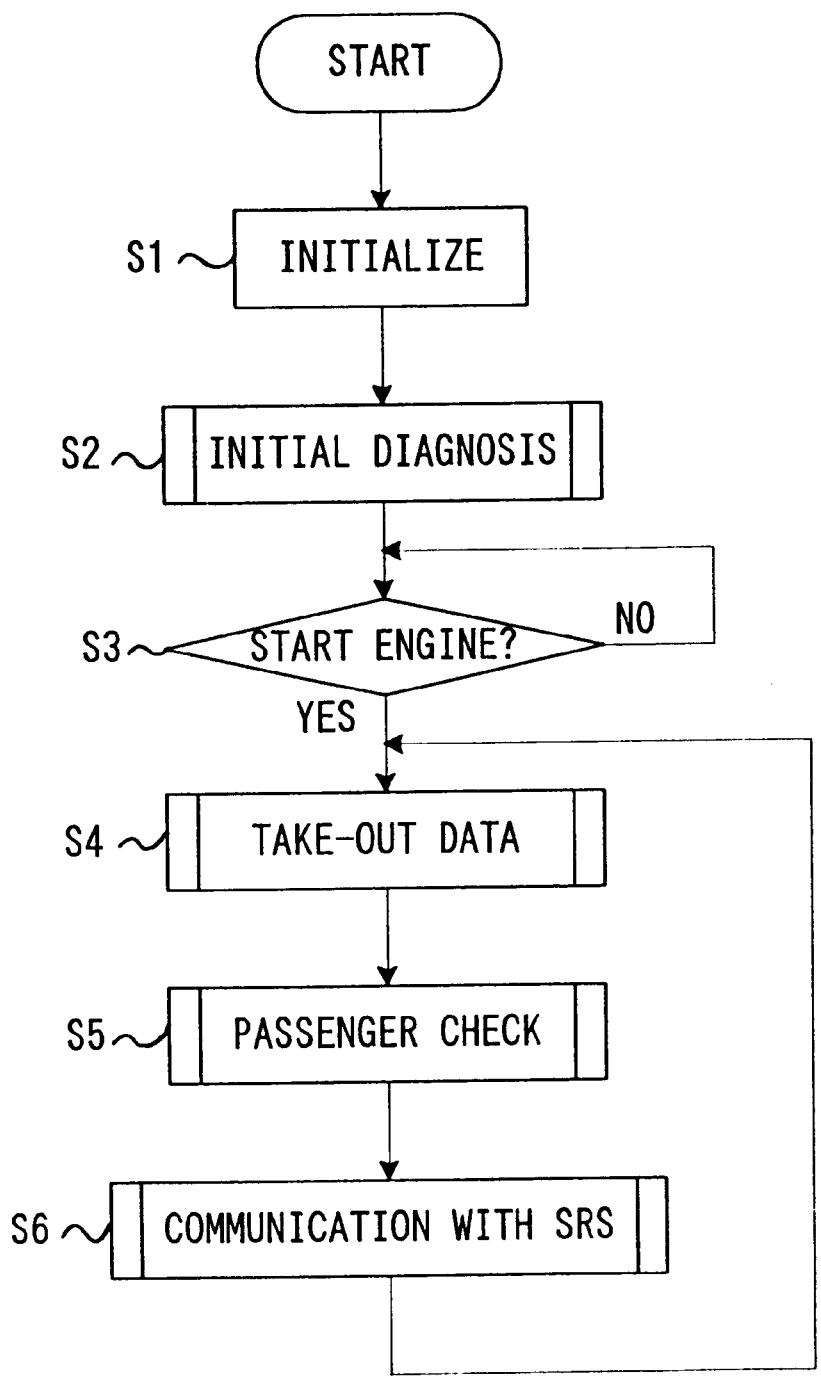
FIG. 7 is a flow chart illustrating passenger sensing by the passenger sensing system according to the present invention.

The operation of the passenger sensing system will now be described with reference to FIGS. 7 to 11. FIG. 7 shows the main routine. The routine is started when the ignition switch is turned on. In a step S1, the system is initialized. Then in a step S2 initial diagnosis concerning the communication system between the control circuit 17 and the air bag unit 30 is made. Then in a step S3 whether the engine has been started is checked. When it is determined that the engine has been started, the routine goes to a step S4. Otherwise, the routine goes back to the step S3. In the step S4, the temperature pattern of the heat sources 6 of the background heat source unit 4, detected by the infrared sensor 7, and the data concerning the passenger's body temperature, are taken out. Then in a step S5 the control circuit 17 checks whether a passenger is present according to the taken-out data. Then in a step S6 the control circuit 17 gets into communication with the air bag unit (SRS) 30 according to the result of the check in the step S5. When the step S4 is ended, the routine goes back to the step S4 to repeat the steps S4 to S6. It is possible to omit the step S3.

Figure 8:
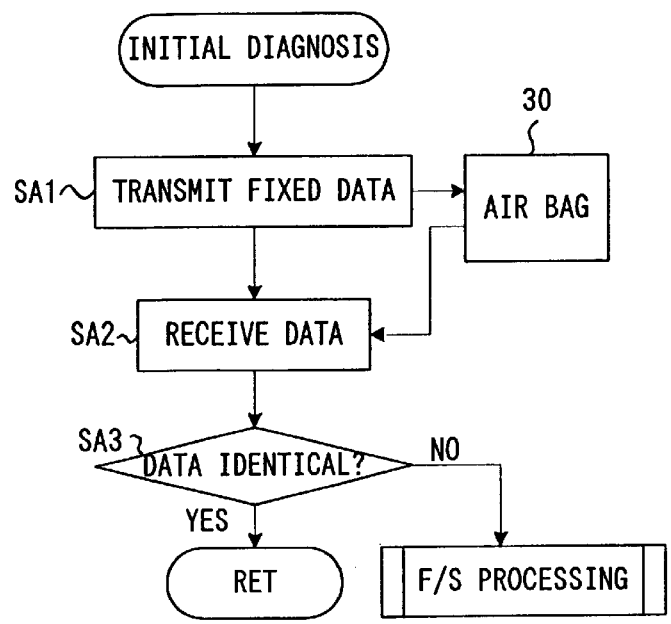
FIG. 8 is a flow chart illustrating an initial diagnosis step shown in FIG. 7.

The initial diagnosis step shown in FIG. 7 is executed as shown in FIG. 8. First, in a step SA1 the control circuit 17 transmits fixed data to the control circuit CC in the air bag unit 30. Then in a step SA2 the control circuit 17 receives data transmitted from the air bag unit 30. Then in a step SA3 the control circuit 17 checks whether its data transmitted to the air bag unit 30 and data therefrom are identical. When it is determined that the two data are identical, the main routine is continued. When the two data are not identical, it is determined that the communication system is abnormal, and a fail-safe step is executed. In the fail-safe step, an alarm lamp, for instance, is turned on. This initial diagnosis step may alternatively executed such that the control circuit CC in the air bag unit 30 checks the identity of the fixed data transmitted from the control circuit 17 to the air bag unit 30.

Figure 9:
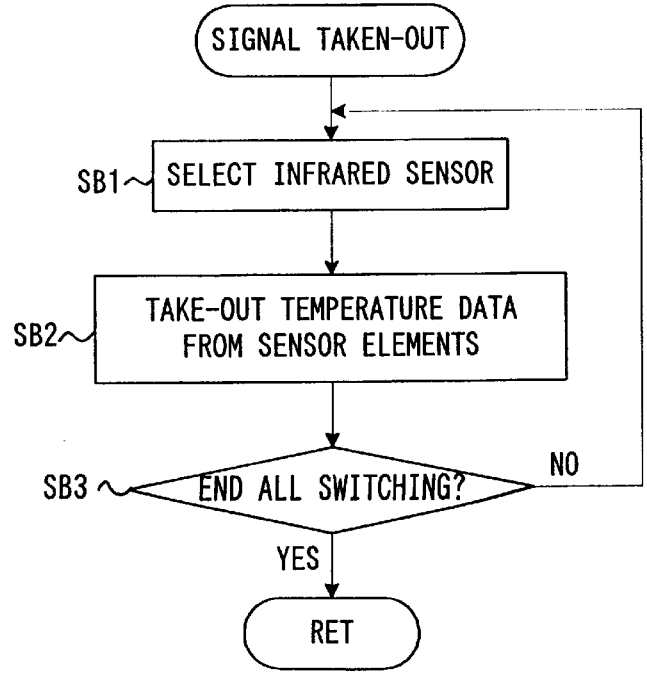
FIG. 9 is a flowchart illustrating a signal take-out step shown in FIG. 7.

The signal take-out step shown in FIG. 7 is executed as shown in FIG. 9. First, in a step SB1 the sensor elements in the infrared sensor 7 are selected sequentially by sequentially closing switching means in the switching circuit 14. Then in a step SB2 temperature data are taken out from the sensor elements. Then in a step SB3 a check is made as to whether the switching of all the switching means in the switching circuit 14 has been ended. When it is determined that the switching of all the switching means has been ended, the main routine is continued. When it is not determined that the switching of all the switching means has been ended, the routine goes back to the step SB1.

Figure 10:
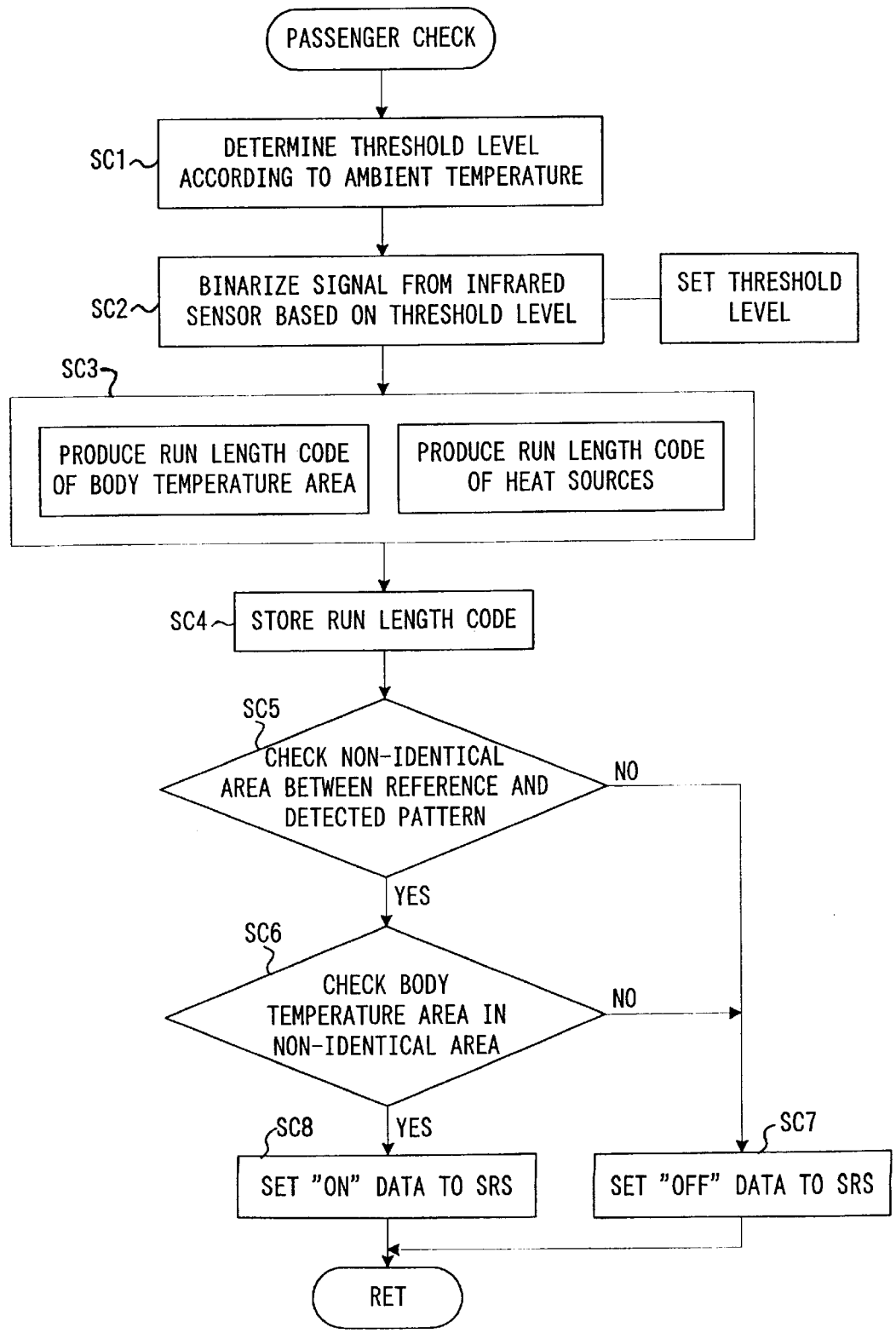
FIG. 10 is a flow chart illustrating a passenger check step shown in FIG. 7.

The passenger check step shown in FIG. 7 is executed as shown in FIG. 10. First in a step SC1 the threshold level is determined according to the ambient temperature data from the temperature sensor 11 or the like. Then in a step SC2 the signal from the infrared sensor 7 (i.e., switching circuit 14) is binalized on the basis of binalizing conditions concerning the threshold data from the threshold determining circuit 13 and body temperature. Then in a step SC3 a run length code of the heat sources corresponding to the binalized data is generated from the binalized signal. Thus, in a step SC4 the control unit 17 stores the run length code in the first and second run length code memories, and then the routine goes to a step SC5. In the step SC5, the control unit 17 checks for any non-identical area in the reference temperature pattern (i.e., reference heat source pattern) and detected temperature pattern (i.e., detected heat source pattern) by comparing the two patterns. When it is determined that a non-identical area is present, the routine goes to a step SC6. When it is determined that no identical area is present, the routine goes to a step SC7. In the step SC6, the control unit 17 makes a check according to the second run length code as to whether a body temperature area is present in the non-identical area. When it is determined that a body temperature area is present in the non-identical area the routine goes to a step SC8. In the step SC8, the control unit 17 sets "on" data to set the air bag of the air bag unit 30 to be ready or expansion, and the routine then goes to the step for communication with the SRS. When it is determined in the step SC6 that no body temperature area is present in the non-identical area, it is determined that no object having a temperature in the neighborhood of the body temperature is covered in the non-identical area, and the routine goes to the step SC7. In the step SC7, the control unit 17 sets "off" data to prohibit the expansion of the air bag in the air bag unit 30.

Figure 11:
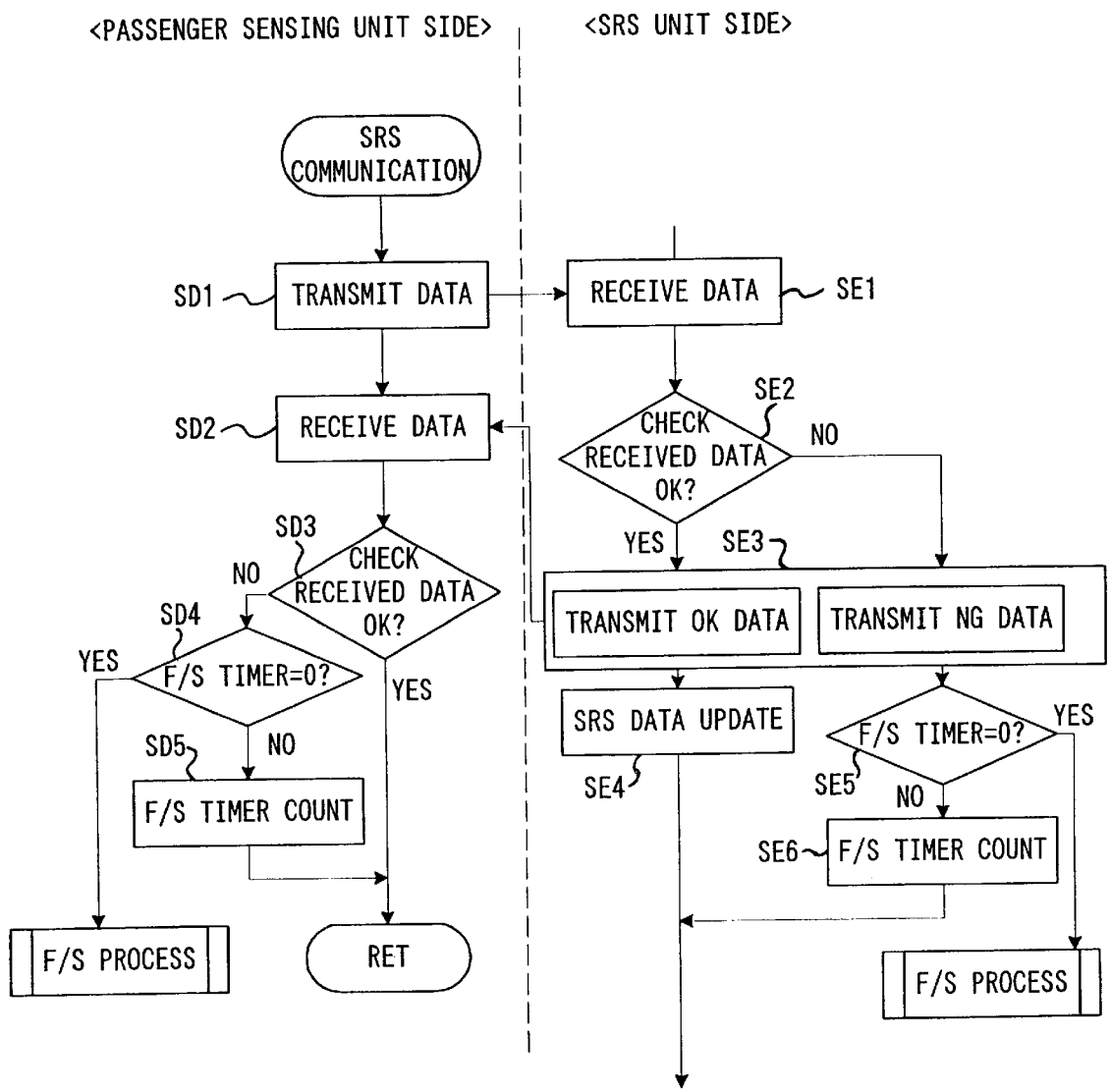
FIG. 11 is a flow chart illustrating a step of communication with SRS shown in FIG. 7.
Figure 12:
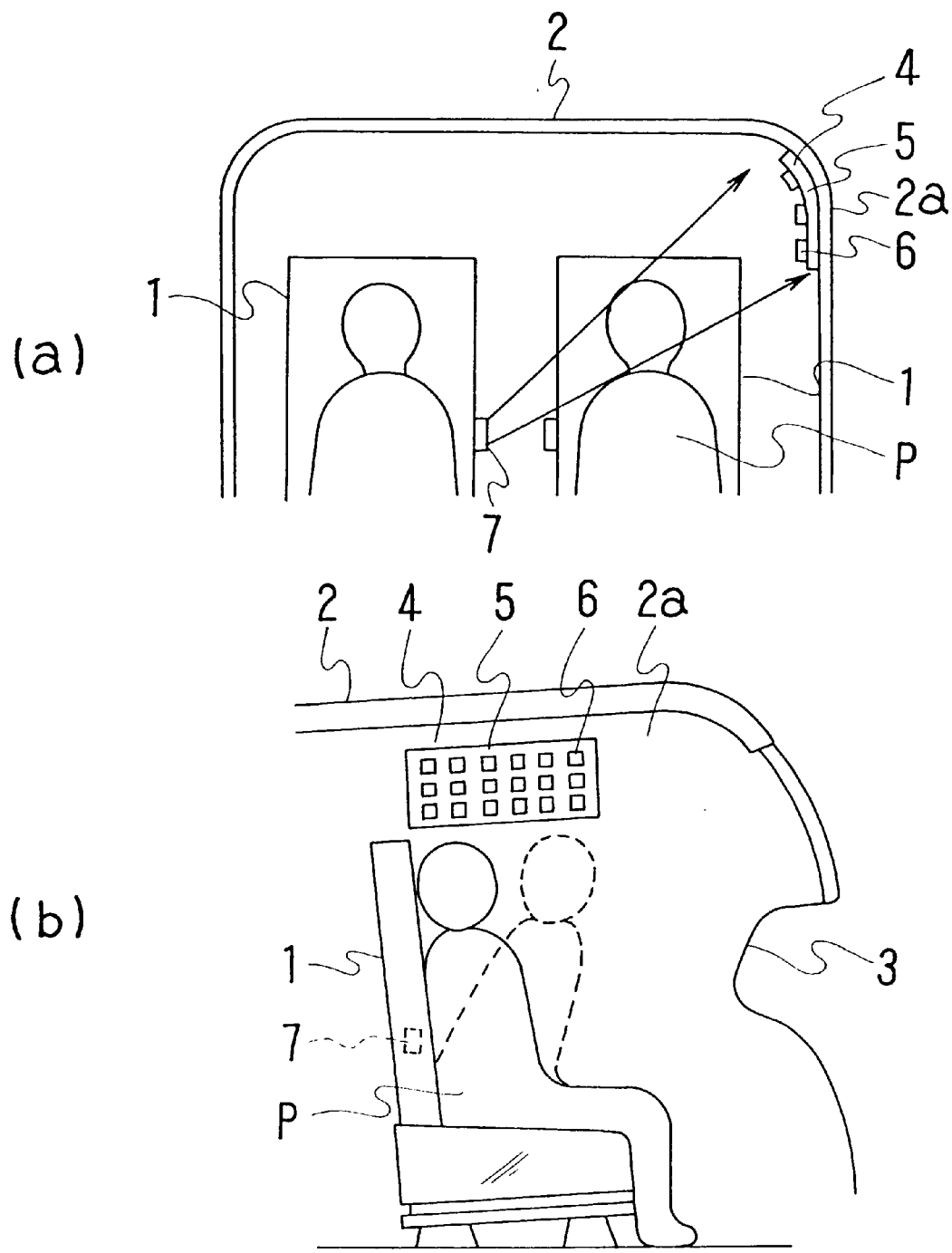
FIGS. 12(a) and 12(b) are views showing a second embodiment of the passenger sensing system according to the present invention, FIG. 12(a) being a front view, FIG. 12(b) being a side view.
Figure 13:
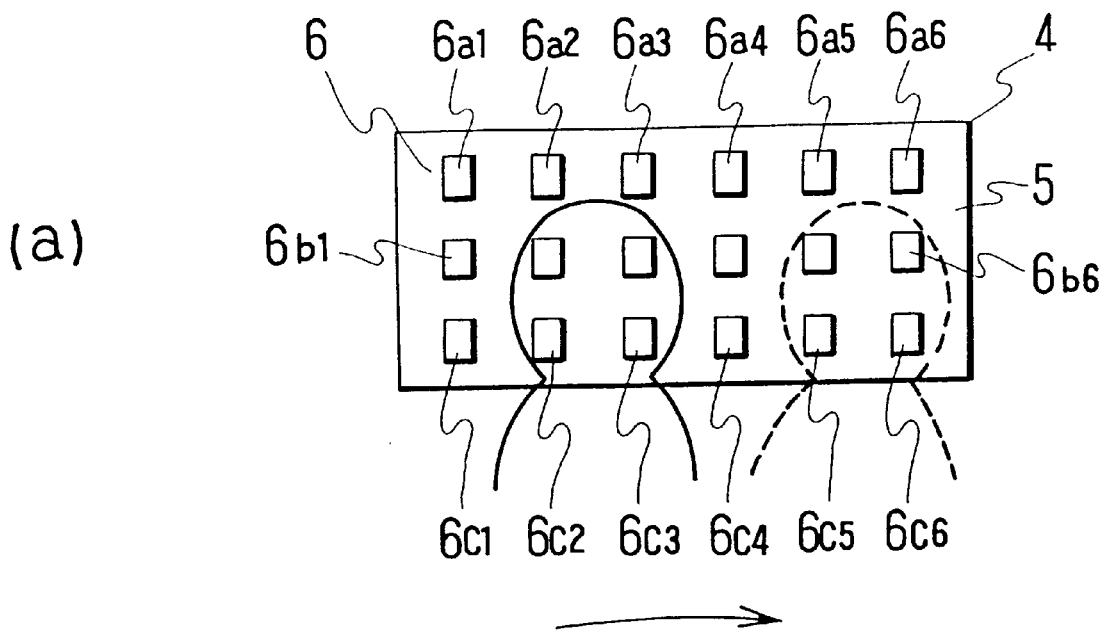
FIGS. 13(a) to 13(d) are views for describing temperature patterns concerning the passenger sensing system in FIGS. 12(a) and 12(B), FIG. 13 (a) being a front view showing a background heat source unit, 13(b) showing a reference temperature pattern of the background heat source unit, FIG. 13(c) showing a detected temperature pattern of the background heat source unit, detected by an infrared sensor when a passenger is present in the solid line position in FIG. 12(a), FIG. 12(d) showing a detected temperature pattern of the background heat source unit, detected by the infrared sensor when a passenger is present in the dashed line position in FIG. 12(a)
Figure 13:
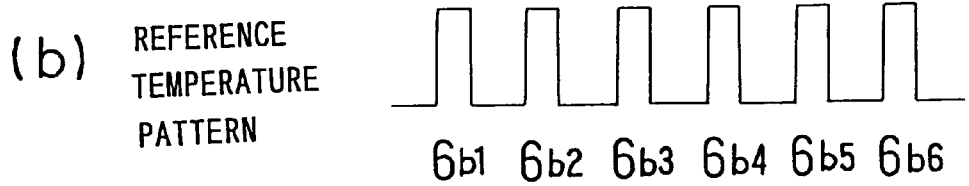
Figure 13:
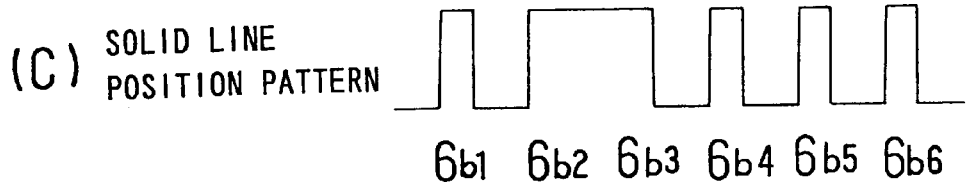
Figure 13:
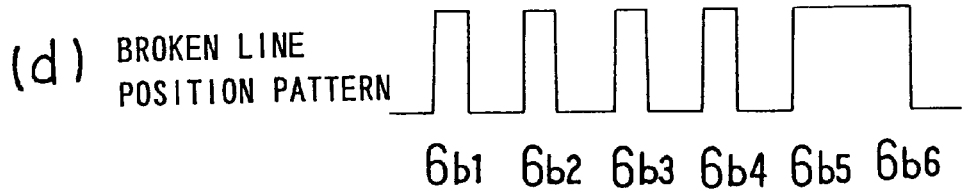

The step of communication with SRS shown in FIG. 7 is executed, for instance, as shown in FIG. 11. First, in a step SD1 the passenger sensing unit side (i.e., control circuit 17) transmits "on" or "off" data for setting the air bag in the air bag unit 30 to be ready for expansion or prohibiting the expansion and also check data to the air bag unit side (i.e., control circuit CC). Then in a step SD2, the passenger sensing unit side receives OK or NG data concerning the ON or OFF data and also the check data from the airbag unit side. Then in a step SD3 the passenger sensing unit side checks whether the "on/off" data and check data, transmitted to and returned from the air bag unit side, are OK. When it is determined that the data is OK (that is, the communication system is normal), the main routine is continued. When it is determined that the communication system is abnormal, the routine goes to a step SD4. In the step SD4, whether fail-safe timer data has become zero is checked. The number of times, by which the check as to whether the communication system is normal, is set, for example, to three. Thus, when it is determined that the fail-safe timer data has become zero, a fail-safe step is executed. When it is determined that the fail-safe timer data has not become zero, the routine goes to a step SD5, the counting of the fail-safe timer is caused, and the main routine is continued.

In the meantime, in a step SE1 the air bag unit side (i.e., control circuit CC) receives "on-off" data for setting the air bag in the air bag unit 30 to be ready for expansion or prohibiting the expansion and check data from the passenger sensing unit side (i.e., control circuit 17). Then in a step SE2 the received data is checked, that is, it is checked whether data is normally received. In either case, the routine goes to a step SE3 of transmitting either OK or NG data together with the check data to the passenger sensing unit side. When it is determined in the step SE2 that the communication system is normal, the routine goes through the OK data transmission step in the step SE3 to a step SE4. In the step SE4, the air bag unit side data is updated according to the OK data. Thus, the air bag is newly set such that it is ready to be expanded or its expansion is prohibited. When it is determined in the step SE2 that the communication system is abnormal, the routine goes through the NG data transmission step in the step SE3 to a step SE5. In the step SE5, whether the fail-safe timer data has become zero is checked. The number of times of checking whether the communication system is normal is set to three, for instance. When it is determined that the fail-safe timer data has become zero, an alarm lamp, for instance, is turned on. When it is not determined that the fail-safe timer data has become zero, the routine goes to a step SE6, in which the counting of the fail-safe timer is caused, and then the main routine is continued.

In this embodiment, whether a passenger is present can be readily checked by comparing the detected temperature pattern of the background heat source unit 4, detected by the infrared sensor 7, and the reference temperature pattern of the sole background heat source unit 4 and checking whether a non-identical area is present in the compared temperature patterns. When a non-identical area is present, it can be confirmed that an object which disturbs the reference temperature pattern is covered in the non-identical area, more simply it can be confirmed that a passenger is present. When no non-identical area is present, it can be determined that no passenger is present.

Particularly, with a plurality of heat sources 6 arranged substantially at a fixed interval, the number of compared patterns in the detected and reference temperature patterns is increased, thus permitting improvement of accuracy of the non-identical area check with comparison of the two temperature patterns. Thus, it is possible to improve the property of the check as to whether a passenger is present.

Besides, since the temperature of the heat sources 6 in the background heat source unit 4 is set a temperature which is different from the body temperature of the passenger P and also from the ambient temperature, even by setting the temperature of the background heat source unit 4 with the infrared sensor 7 via the passenger P, it is possible to obtain a detection output permitting the discrimination of the body temperature and the temperature of the heat sources 6 from each other, for instance as shown in FIG. 6(b), and also obtain discrimination from the ambient temperature. As an example, the infrared sensor 7 of non-cooled barometer type utilizing changes in resistance with temperature, has a temperature resolution of about 0.1° C., and is theoretically capable of detecting a temperature difference of 0.1° C. or above. Even when the temperature fluctuation of the background heat source unit 4 are taken into considerations, the infrared sensor 7 can reliably detect a temperature difference of 2 to 3° C., preferably about 5° C. It is thus possible to accurately check whether a passenger is present without being adversely affected by the ambient temperature by comparing the detected temperature pattern from the infrared sensor 7 and the reference temperature pattern.

Particularly, since the threshold level in the process of binalizing the detection output of the infrared sensor 7 is determined on the basis of the ambient temperature detected by the temperature sensor 11 and the heat source temperature, it is possible to obtain a detected temperature pattern free from any influence of heat source temperature fluctuations, if any, from the first binalizing circuit 15. It is thus possible to obtain adequate run length coding and improve the accuracy of comparison with the reference run length code corresponding to the reference temperature pattern.

Furthermore, the run length coding of the detected and reference temperature patterns does not only facilitate the comparison of the two temperature patterns but also permits reduction of the memory capacities of the first and second run length code memories 18 and 18A and consequent size reduction of the control circuit 17.

Still further, the detection output of the infrared sensor 7 is binalized with the body temperature and a temperature different therefrom as two conditions of the binalization and then run length coded (in the second run length coding), and in the case of presence of a body temperature area a pattern as shown in FIG. 6(d), for instance, is obtained. Thus, in the presence of a non-identical area between the two patterns, detected as a result of comparison of the detected and reference temperature patterns, whether the non-identical area include a body temperature area is checked with reference of the second run length code. When it is determined that a body temperature area is present, the non-identical area shows the presence of a passenger. When it is determined that no body temperature area is present, it is accurately determined that the object present in the non-identical area is other than any passenger.

Yet further, since the position detecting unit 23 in the control circuit 17 computes the position of the non-identical area, the position of the passenger P can be accurately known. For example, when a passenger P is present in a central part of the background heat source unit 4 including the heat sources $6b_3$ and $6b_4$, the detected temperature pattern is as shown in FIG. 6(b), the position of the non-identical area is computed on the basis of comparison with the reference temperature pattern to be represented by coordinates corresponding to the heat sources $6b_3$ and $6b_4$. When the position of the passenger P is deviated toward the heat source $6b_1$ or $6b_6$ or toward the heat sources $6a$ (i.e., upward) or the heat sources $6c$ (downward), the non-identical area corresponding to the reference temperature pattern appears on the part reached as a result of the deviation. Thus, the position of the passenger P can be readily determined by computing the corresponding coordinates. It is thus possible to obtain an accurate check for the presence of passenger P, if any, with position data thereof.

The control circuit 17 transmits the result of detection in the non-identical area detecting unit 21 when rough data is required to the air bag unit 30, while it transmits the result of check in body temperature check unit 23 when high detection accuracy is required, and the result of detection in the position detecting unit 33 when higher detection accuracy is required. The air bag in the air bag unit 30 is set to be either that it is ready to be expanded or that its expansion is prohibited. Thus, when no passenger is present, the air bag is not expanded even when collision of the car takes place. When the passenger is present, the air bag is reliably expanded in the event of collision, so that damage to be passenger can be prevented.

FIGS. 12(a) and 12(b) and 13(a) to 13(d) show a second embodiment of the passenger sensing system according to the present invention. This embodiment is the same in the basic construction as the first embodiment, and is different only in that the background heat source unit 4 includes heat sources $6a_1$ to $6a_6$, $6b_1$ to $6b_6$ and $6c_1$ to $6c_6$ which are not bar-like but are square or dot-like and is disposed on a door side part 2a of the car on the assistant's seat side, and that the infrared sensor 7 is disposed on a side face of the driver's seat. The background heat source unit 4 and the infrared sensor 7 are disposed such that they face each other on the opposite sides of the passenger P. The background heat source 4 may be disposed on a window glass part. Also, the infrared sensor 7 may be disposed on a part other than the driver's seat so long as it faces the background heat source unit 4 via the passenger. Furthermore, the background heat source unit 4 may be disposed in combination with the infrared sensor on the driver's seat side in the same manner as the it is disposed on the assistant's seat side.

The passenger sensing in this method will now be described. Referring to FIGS. 12(b) and 13(a), when the passenger P is present at the solid line position, the reference temperature pattern of the sole heat sources $6a1$ to $6a_6$, $6b_1$ to $6b_6$ and $6c_1$ to $6c_6$ of the background heat source unit 4 is the same substantially in all parts, as shown in FIG. 13(b) which shows parts of the pattern corresponding to the heat sources $6b_1$ to $6c_6$. In this case, the first binalizing circuit 15 binalizing the detection output of the infrared sensor 7 provides a detected temperature pattern as shown in FIG. 13(c). The pattern comparing unit 19 in the control circuit 17 then compares the first run length code corresponding to the detected temperature pattern as shown in FIG. 13(b) and the reference run length code corresponding to the reference temperature pattern as shown in FIG. 13(b), and thus determines that a non-identical area is present, which corresponds to the heat sources $6b_5$ and $6b_6$. The position detecting part 23 computes the coordinates of the passenger's position from the position of the non-identical area, and checks whether the passenger P is at an apt position in the forward/backward direction. Since the passenger P is present at the dashed line position, he or she is considerably close to dashboard 3, and is thus determined to be at an inapt position in the forward/backward direction.

AS shown in FIGS. 12(b) and 13(a) by broken line, when the passenger P is present in forwardly inclined state, the first binalizing circuit 15 binalizing the detection output of the infrared sensor 7 provides a detected temperature pattern as shown in FIG. 13(d). The pattern comparing unit 19 in the control circuit 17 then compares the first run length code corresponding to the detected temperature pattern as shown in FIG. 13(d) and the reference run length code corresponding to the reference temperature pattern as shown in FIG. 13(b), and thus determines that a non-identical area is present, which corresponds to the heat sources $6b_5$ and $6b_6$. The position detecting part 23 computes the coordinates of the passenger's position from the position of the non-identical area, and checks whether the passenger P is at an apt position in the forward/backward direction. Since the passenger P is present at the broken line position, he or she is considerably close to dashboard 3, and is thus determined to be at an inapt position in the forward/backward direction.

Referring again to FIGS. 12(b) to 13(a), when the passenger P is present at the solid line position, according to the result of detection transmitted from the control circuit 17 to the air bag unit 30, the air bag is set to be ready for expansion. When the passenger P is present at the dashed line position, he or she is determined to be close to the dashboard 3 more than necessary, and the air bag is set such that its expansion is prohibited. Thus, even in the event of collision of the car, the air bag is not expanded to evade secondary damage to the passenger that might otherwise take place.

In this embodiment, it is possible to transmit the result of detection in the non-identity area detecting part 21 as signal from the control circuit 17 to the air bag unit 30. It is also possible to transmit the result of check in the body temperature checking unit 22 or the result of detection in the position detecting unit 23. With the three-row array of a plurality of heat sources 6, it is possible to detect the height position of the head of the passenger P.

Figure 14:
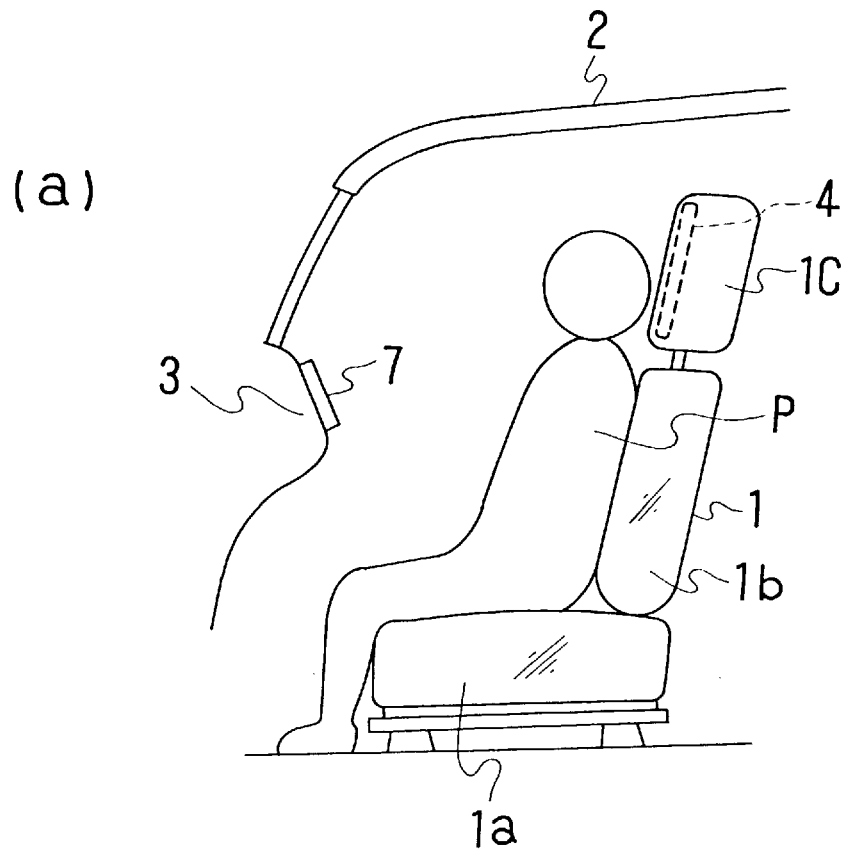
FIGS. 14(a) and 14(b) are views showing a third embodiment of the passenger sensing system according to the present invention, FIG. 14(a) being a side view, FIG. 14(b) being a front view, partly broken away, showing as seat part.
Figure 14:
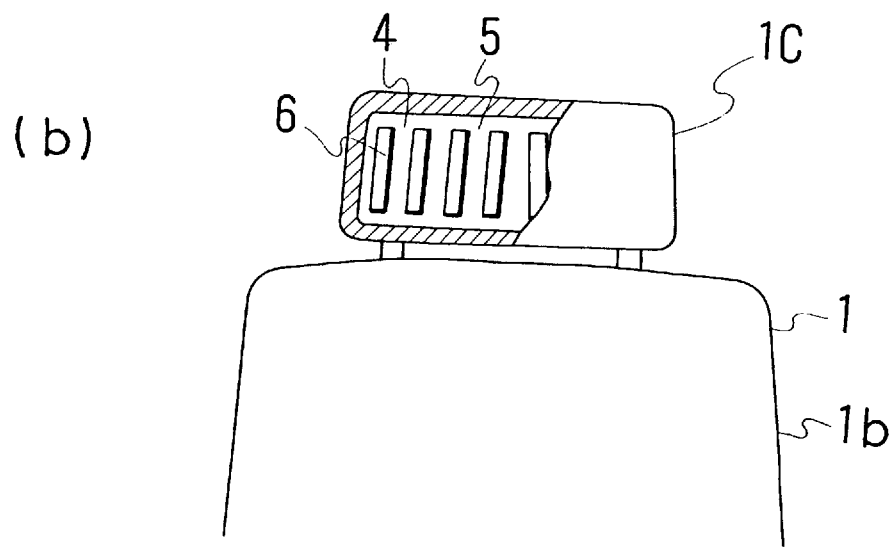

FIGS. 14(a) and 14(b) show a third embodiment of the passenger sensing system according to the present invention. This embodiment is the same in the basic construction as the first embodiment, and is different only in that the background heat source unit 4 is disposed on a head rest part 1c of the seat 1 and includes a plurality of bar-like heat sources 6 arranged in a row substantially at a fixed internal. It is possible to incorporate the second embodiment shown in FIGS. 12(a) and 12(b) and 13(a) to 13(d) in this embodiment. In this embodiment, the background heat source unit 14 which is disposed on the heat rest part 1c, can be more readily installed than it is disposed on the ceiling part 2 as in the first embodiment. In addition, since background heat source unit 4 and the infrared sensor 7 are in a fixed relative position relation, it is possible to detect output fluctuations due to car vibrations. Thus, accurate passenger sensing is obtainable.

A fourth embodiment of the passenger sensing system according to the present invention will now be described. This embodiment is the same in the basic structure as in the first embodiment, and is different only in that the plurality of heat sources 6 of the background heat source unit 4 are constructed as a cooling assembly. The cooling assembly may comprises a plurality of flat pipes, which are disposed substantially at a fixed interval on the ceiling part 2 and inter-connected by connecting pipes such that cooling medium can be passed through the flat pipes via the connecting pipes. The temperature of the cooling assembly as the heat sources 6 is set to a temperature which is different from the body temperature and also from the ambient temperature and lower than the ambient temperature. It is possible to use as the cooling assembly an electronic cooling unit utilizing the Pertier effect. It is also possible to pass controlled temperature water controlled to a temperature different from the body and ambient temperatures through the flat pipes.

In this embodiment, the car room cooling in the summer season may be made from the cooling assembly disposed on the ceiling part 2 as well as by blowing cold air from the dashboard side. Thus, it is not only possible to obtain efficient car room cooling but also possible to improve the rear seat side cooling effect. Better cooling effect can be expected by laying the cooling assembly over a board area of the ceiling part 2.

The embodiments of the present invention as described above are by no means limitative. For example, the plurality of heat sources in the background heat source unit may be arranged not only in a single row or three rows but also in two rows or four or more rows. It is possible to compare the detected temperature pattern from the infrared sensor and the reference temperature pattern as binalized data or space frequency distributions instead of comparison by run length coding. Where the passenger presence check is made by detecting a non-identical area of patterns, it is possible to dispense with the body temperature checking unit, the position detecting unit and the second binalizing circuit. Where the passenger presence check is made on the basis of the result of check in the body temperature checking unit, it is possible to dispense with the position detecting unit. Moreover, the system or method according to the present invention may be utilized for the sole passenger presence check or position detection without being combined with any air bag unit, and may also be combined with a seat belt or the like. Particularly, where the system or method is combined with an air bag unit, it may be combined with a side air bag unit disposed on a door part as well as being combined with an air bag unit disposed ahead of the seat.

As has been described in the foregoing, according to the present invention the passenger presence check may be readily made by comparing the detected temperature pattern of the background heat source unit, a detected by the infrared sensor, and the reference temperature pattern of the sole background heat source unit and checking whether a non-identical area is present in the compared temperature patterns. When a non-identical area is present, it is confirmed that an object which disturbs the reference temperature pattern is present in the non-identical area, and the presence of a passenger can be easily confirmed. When no non-identical area is present, it can be confirmed that no passenger is present.

Particularly, with the background heat source unit in which a plurality of heat sources are arranged substantially at a fixed interval, the number of compared patterns in the detected and reference temperature patterns is increased to improve the accuracy of the non-identical area detection by comparing the two temperature patterns. It is thus possible to improve the detectability of the passenger presence check.

Besides, since the temperature of the heat sources in the background heat source unit are set to a temperature different from the body temperature of the passenger and also from the ambient temperature, it is possible, by measuring the temperature of the background heat source unit with the infrared sensor via the passenger, to obtain such a detection output that the discrimination of the body and heat source temperatures from each other is possible. It is further possible to obtain discrimination from the ambient temperature. Accurate passenger presence check thus can be made without being affected by such ambient conditions as the ambient temperature by comparing the detected temperature pattern from the infrared sensor and the reference temperature pattern.

Furthermore, with the arrangement such as to cause, upon detection of a non-identical area as a result of the comparison of the detected and reference temperature patterns, a check as to whether a body temperature area is present in the non-identical area, it is possible to obtain apt decision as to whether the non-identical area stems from the body temperature of a passenger. Thus, it is possible to make more accurate passenger presence check.

Moreover, with the arrangement such as to cause computation of a non-identical area in the case of presence of a body temperature area in the non-identical area, or irrespective of whether a body temperature area is present, it is possible to accurately know the position and the seated posture of the passenger. According to this position information, the air bag unit may be controlled to set the air bag thereof such that the air bag is ready for expansion or that expansion of the air bag is prohibited.

Particularly, by permitting control of the air bag unit according to the result of the non-identical area check by comparing the detected and reference temperature patterns, it is not only possible to prevent unnecessary expansion of the air bag unit but also possible to simplify the system construction.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A passenger sensing system comprising a background heat source unit including a plurality of heat sources arranged substantially at a fixed interval, the background heat source unit being set to a temperature different from the body temperature of a passenger and also from the ambient temperature, an infrared sensor facing the background heat source unit, for detecting the temperature of the heat sources, and a control circuit for checking whether a passenger is present according to the result of a check, made by comparing a detected temperature pattern of the background heat source unit, detected by the infrared sensor, and a preliminarily stored reference temperature pattern of the background heat source unit, also whether a non-identical area is present in the compared temperature patterns.

2. The passenger sensing system according to claim 1, wherein the control circuit checks, by comparing the detected temperature pattern of the background heat source unit, detected by the infrared sensor, and the reference temperature pattern of the background heat source unit, preliminarily stored in it, whether a non-identical area is present in the compared temperature patterns and, when a non-identical area is present, computes the position thereof relative to the reference temperature pattern.

3. A passenger sensing system comprising a background heat source unit including a plurality of heat sources arranged substantially at a fixed interval, the background heat source unit being set to a temperature different from the body temperature of a passenger and also from the ambient temperature, an infrared sensor facing the background heat source unit, for detecting the temperature of each of the heat sources, a body temperature detecting circuit for extracting a body temperature pattern of a passenger from the detected temperature pattern from the infrared sensor, and control circuit for checking whether a passenger is present according to the output signals from the infrared sensor and the body temperature detecting circuit, wherein the control circuit checks whether a passenger is present according to the result of a check, made by comparing a detected temperature pattern of the background heat source unit, detected by the infrared sensor, and a reference temperature pattern of the background heat source unit, preliminarily stored in it, as to whether a non-identical area is present in the compared temperature patterns and, when a non-identical area is present, checks whether a passenger is present by checking, according to output signal from the body temperature detecting circuit, whether a body temperature area is present in the non-identical area.

4. The passenger sensing system according to claim 3, wherein the control circuit compares a detected temperature pattern of the background heat source unit, detected by the infrared sensor, and a reference temperature pattern of the background heat source unit, preliminarily stored in it, when a non-identical area is present in the compared temperature patterns, checks, according to output signal from the body temperature detecting circuit, whether a body temperature area is present and, when a body temperature area is present, computes the position of the non-identical area relative to the reference temperature pattern.

5. A passenger sensing system comprising a background heat source unit including a plurality of heat sources arranged substantially at a fixed interval, the background heat source unit being set to a temperature different from the body temperature of a passenger and also from the ambient temperature, an infrared sensor facing the background heat source unit, for detecting the temperature of each of the heat sources, a control circuit for checking whether a passenger is present according to the result of a check, made by comparing a detected temperature pattern of the background heat source unit, detected by the infrared sensor, and a preliminarily stored reference temperature pattern of the background heat source unit, as to whether a non-identical area is present in the compared temperature patterns, and an air bag unit having a function of expanding an air bag in response to a collision of the car, wherein the air bag of the air bag unit is set, according to check result data transmitted from the control circuit to the air bag unit, such that it is ready to be expanded or that its expansion is prohibited.

6. A passenger sensing system comprising a background heat source unit including a plurality of heat sources arranged substantially at a fixed interval, the background heat source unit being set to a temperature different from the body temperature of a passenger and also from the ambient temperature, an infrared sensor facing the background heat source unit, for detecting the temperature of each of the heat sources, a control circuit for comparing a detected temperature pattern of the background heat source unit, detected by the infrared sensor, and a preliminarily stored reference temperature pattern of the background heat source unit, and checking, when a non-identical area is present in the compared temperature patterns, whether a passenger is present by checking, according to output signal from the body temperature detecting circuit, whether a body temperature area is present in the non-identical area, and an air bag unit having a function of expanding air bag in response a collision of the car, wherein the air bag in the air bag unit is set, according to check result data transmitted from the control circuit to the air bag unit, such that it is ready for expansion or that its expansion is prohibited.

7. The passenger sensing system according to claim 6, wherein the control circuit checks, by comparing the detected temperature pattern of the background heat source unit, detected by the infrared sensor, and the reference temperature pattern of the background heat source unit, preliminarily stored in it, whether a non-identical area is present in the compared temperature patterns, when a non-identical area is present, computes the position thereof relative to the reference temperature pattern, and checks whether the passenger is seated in the seat at a position thereof within permissible range, and the air bag unit sets, according to the check result, the air bag such that the air bag is ready for expansion or that expansion of the air bag is prohibited.

8. The passenger sensing system according to one of claims 1 to 7, wherein the heat sources in the background heat source unit are controlled, according to output signal from a temperature sensor for detecting the ambient temperature, to a temperature from the body temperature of passenger and also from the ambient temperature.

9. The passenger sensing system according to one of claims 1 to 7, wherein the background heat source unit is disposed on a ceiling part of the car or on a door side part of a seat of the car, and the infrared sensor is disposed that an upper half of a passenger will be found between the infrared sensor and the background heat source unit.

10. The passenger sensing system according to one of claims 1 to 7, wherein the background heat source unit includes a plurality of heat sources arranged at a fixed interval and made integral with a sheet-like insulating member having low heat conductivity.

11. The passenger sensing system according to claim 10, wherein the heat sources of the background heat source unit are bar-like or dot-like in shape.

12. The passenger sensing system according to one of claims 1 to 7, wherein the heat sources of the background heat source unit are constituted by substantially planer heaters and set to a temperature higher than the ambient temperature.

13. The passenger sensing system according to one of claims 1 to 7, wherein the heat source so the background heat source unit are constituted by a cooling assembly and set to a temperature lower than the ambient temperature.

14. A passenger sensing method using a background heat source unit having a predetermined temperature pattern and an infrared sensor, the background heat source unit and the infrared sensor being disposed such that they face each other, the method comprising the steps of comparing a detected temperature pattern of the background heat source unit, detected by the infrared sensor, and a reference temperature pattern of the sole background heat source unit, and checking whether a passenger is present by checking whether as non-identical area is present in the compared temperature patterns.

15. The passenger sensing method according to claim 14, wherein when a non-identical area is present in the compared detected and reference temperature patterns, the check as to whether a passenger is present is made by checking whether a passenger's body temperature area is present in the non-identical area.

16. The passenger sensing method according to claim 14, wherein when a non-identical area is present in the compared detected and reference temperature patterns, the position at which the passenger is seated in the seat is detected by computing the position of the non-identical area relative to the reference temperature pattern.

17. The passenger sensing method according to claim 15, wherein when a non-identical area is present in the compared detected and reference temperature patterns, whether a passenger's body temperature area is present in the non-identical area is checked and, when a body temperature area is present, the position of the non-identical area relative to the reference temperature pattern is checked.

18. A passenger sensing method using a background heat source unit having a predetermined temperature pattern and an infrared sensor, the background heat source unit and the infrared sensor being disposed such that they face each other, and comprising the steps of comparing a detected temperature pattern of the background heat source unit, detected by the infrared sensor, and a reference temperature pattern of the sole background heat source unit, checking whether a passenger is present by checking whether a temperature pattern is present in the non-identical area, and transmitting check result signal to an air bag unit to set an air bag in the air bag unit such that the air bag is ready for expansion or that expansion of the air bag is prohibited.

* * * * *